US006329593B1

(12) United States Patent
Yang

(10) Patent No.: US 6,329,593 B1
(45) Date of Patent: Dec. 11, 2001

(54) WATERPROOF LED DISPLAY

(75) Inventor: Chung-Chin Yang, Taipei (TW)

(73) Assignee: Formosa Industrial Computing Inc., Taipei (TW)

( * ) Notice: Subject to any disclaimer, the term of this patent is extended or adjusted under 35 U.S.C. 154(b) by 0 days.

(21) Appl. No.: 09/562,607

(22) Filed: May 1, 2000

(51) Int. Cl.[7] .............................. H05K 5/06; H02G 3/08; H01J 5/00
(52) U.S. Cl. ...................... 174/52.3; 174/52.1; 174/50.5; 174/50.52; 362/800; 362/812
(58) Field of Search .................................. 174/52.1, 52.3, 174/50.5, 50.51, 50.52, 50.54, 60, 64; 361/748, 752; 362/800, 812; 313/500, 318.01, 318.09, 318.1; 439/611

(56) References Cited

U.S. PATENT DOCUMENTS

| 4,791,258 | * | 12/1988 | Youtz et al. ...................... 200/302.1 |
| 5,036,248 | * | 7/1991 | McEwan et al. .................... 313/500 |
| 5,526,236 | * | 6/1996 | Burnes et al. ........................ 362/20 |
| 5,949,581 | * | 9/1999 | Kurtenbach et al. ................ 359/621 |
| 6,154,362 | * | 11/2000 | Takahashi et al. ................... 361/695 |

FOREIGN PATENT DOCUMENTS

8320657 * 12/1996 (JP) .

* cited by examiner

Primary Examiner—Dear A. Reichard
(74) Attorney, Agent, or Firm—Thomas, Kayden, Horstemeyer & Risley LLP

(57) ABSTRACT

A waterproof LED display has a housing and a circuit board with a plurality of LEDs provided in the housing. A back seat is formed at a rear portion and a back cover is mounted on the back seat. The back seat forms a first rim defining an opening and has a channel defined around the opening. A gasket is provided in the channel. The back seat and the back cover respectively have complementary teeth to engage with each other to form a zigzag path between them. The back cover further has a plurality of vertical slots defined in a bottom portion thereof and a plurality of flexible conduits respectively received in the vertical slots and extended out from the slots. Wires of the circuit board are extended out along the flexible conduits.

5 Claims, 6 Drawing Sheets

WATERPROOF LED DISPLAY

BACKGROUND OF THE INVENTION

1. Field of the Invention

The present invention is related to an LED display, and more particularly to a waterproof LED display which has a watertight construction designed at a rear portion thereof.

2. Description of Related Art

In advertising, a signboard made of an LED display generally standing at a conspicuous location, such as a bustling road, is widely used. The LED display comprises a plurality of LEDs controlled by special hardware and software to perform moving images on a screen thereof to attract the attention of passersby.

Referring to FIG. 6, a conventional LED display has a housing (30) and a circuit board (31) mounted in the housing (30). The circuit board (31) has a plurality of LEDs (not shown or numbered) formed at a front surface thereof, and electronic components and wires provided at a back surface thereof. A back cover (32) for service access is provided at a rear portion of the housing (30).

Because the LED display does not have a waterproof construction at the rear portion, water and water vapor can easily penetrate the housing (30) via gaps between the back cover (32) and the housing (30), and the circuit board (31) will become dampen and damaged.

Therefore, it is an objective of the invention to provide a waterproof LED display to mitigate and/or obviate the aforementioned problems.

SUMMARY OF THE INVENTION

The main objective of the present invention is to provide an LED display which has an effective waterproof function to prevent water and water vapor from penetrating inside via gaps at a rear portion thereof.

Other objects, advantages and novel features of the invention will become more apparent from the following detailed description when taken in conjunction with the accompanying drawings.

DETAILED DESCRIPTION OF THE PREFERRED EMBODIMENT

Figure 1:
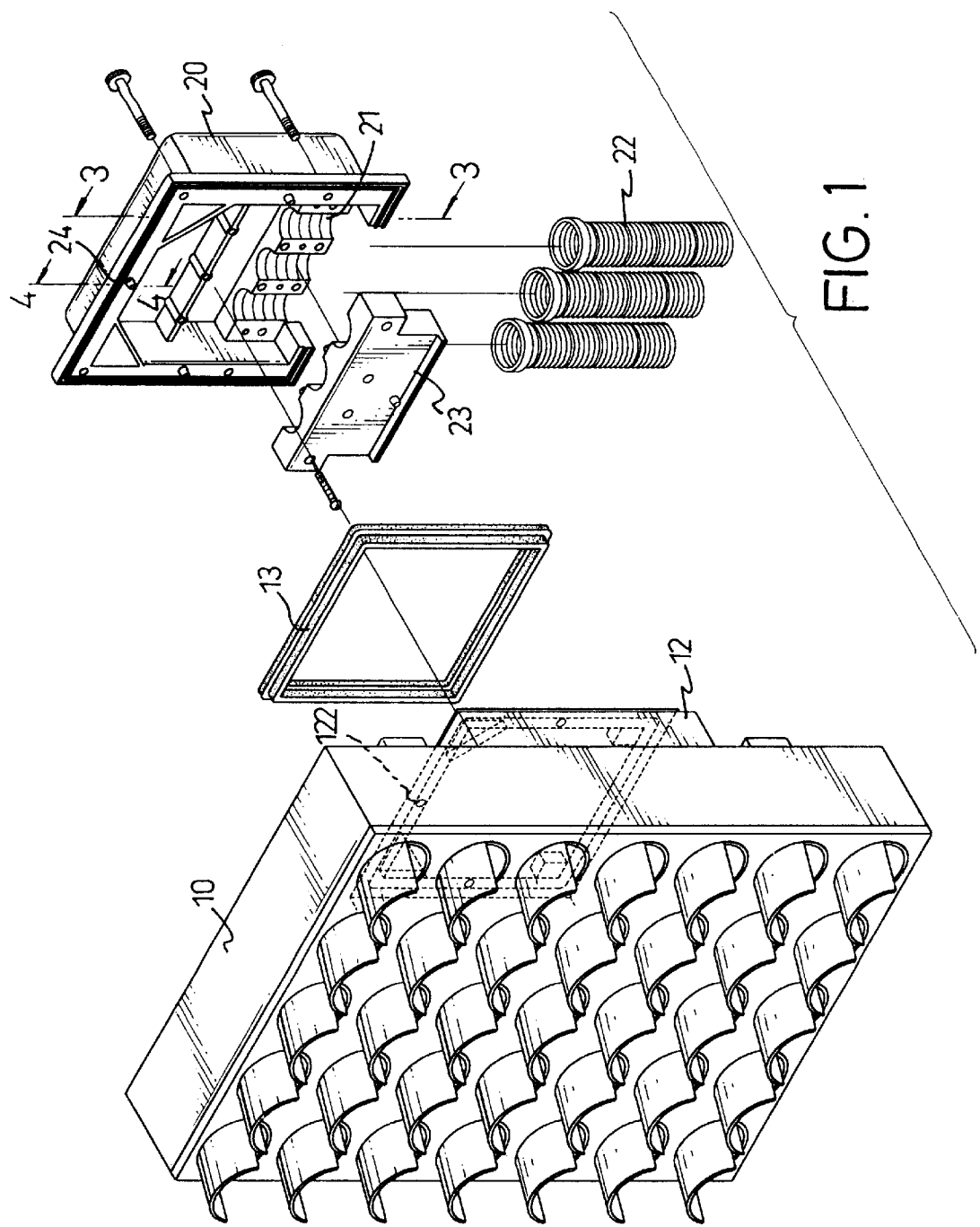
FIG. 1 is an exploded perspective view of a waterproof LED display in accordance with the invention.
Figure 2:
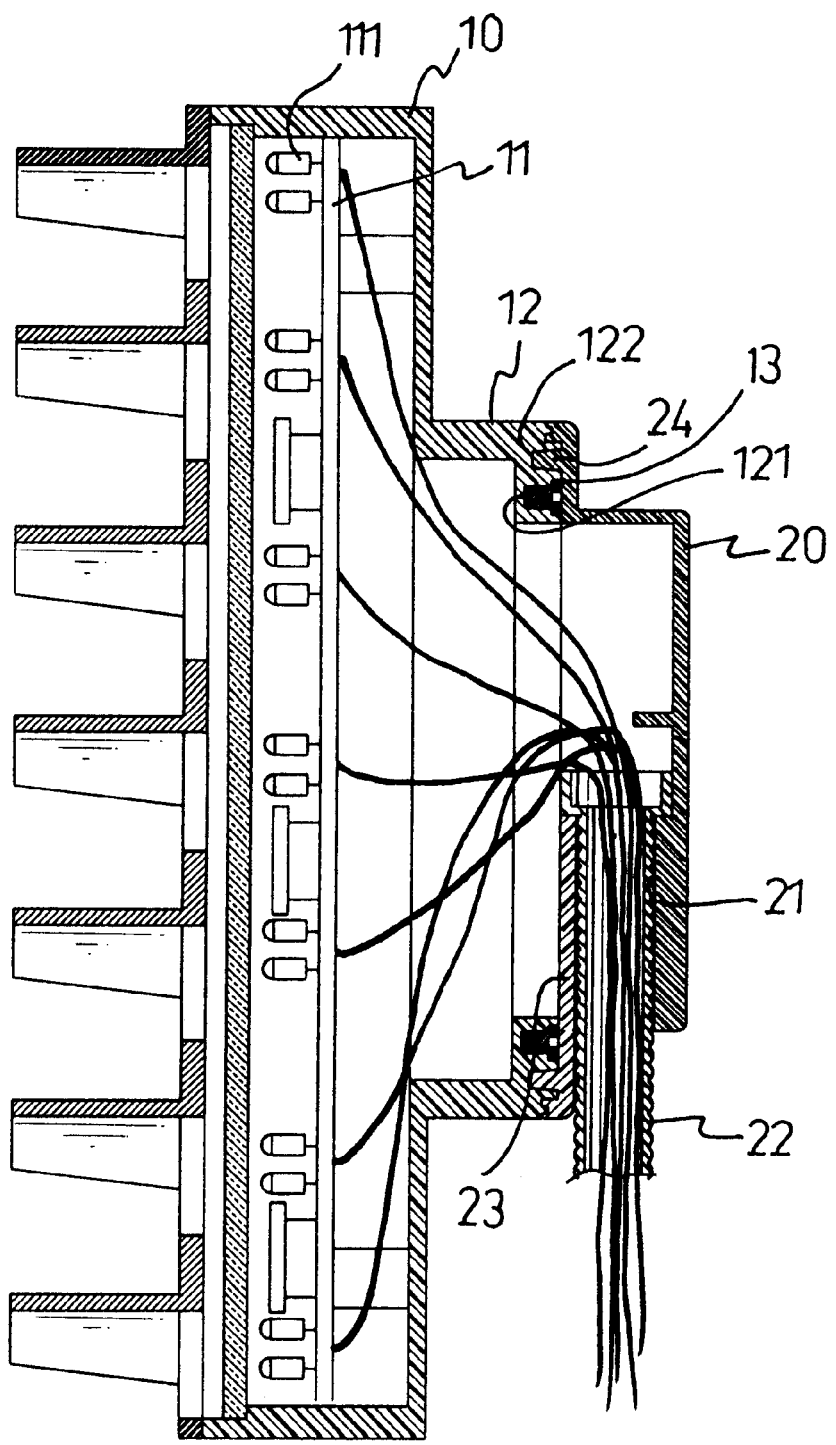
FIG. 2 is a sectional view of the waterproof LED display of FIG. 1.

Referring to FIGS. 1 and 2, an LED display in accordance with the present invention comprises a housing (10). A circuit board (11) is provided within the housing and has a plurality of LED groups (111) formed thereon. The circuit board (11) includes electronic components (not shown or numbered) electrically connected to the LEDs (111).

A hollow back seat (12) is formed on a rear face of the housing (10) and has a first rim (not numbered) defining an opening (not numbered). The rim has a channel (121) defined around the opening and a plurality of holes (122) defined outside the channel (121). A gasket (13) is received in the channel (121).

A back cover (20), having a chamber (not numbered) corresponding to the opening of the back seat and a second rim (not numbered) formed around the chamber, is mounted on the back seat (12) by fasteners (not numbered). A plurality of stubs (24) is formed on the second rim of the back cover (20) and respectively aligned with and engaged in the holes (122) of the back seat (12) to facilitate the assembling, especially viewed in FIGS. 3 and 4. The back cover (20) has a plurality of vertical slots (21) each composed of two half-slots, in which first half-slots are defined in a movable block (23) mounted in a notch (not numbered) defined at a bottom portion of the back cover (20), and second half-slots are defined in an inner wall of the chamber beside the notch. Each of the slots (21) has a flexible conduit (22) received therein and fastened by the movable block (23). Wires (not numbered) of the circuit board (11) are extended out along the flexible conduits (22).

Figure 3:
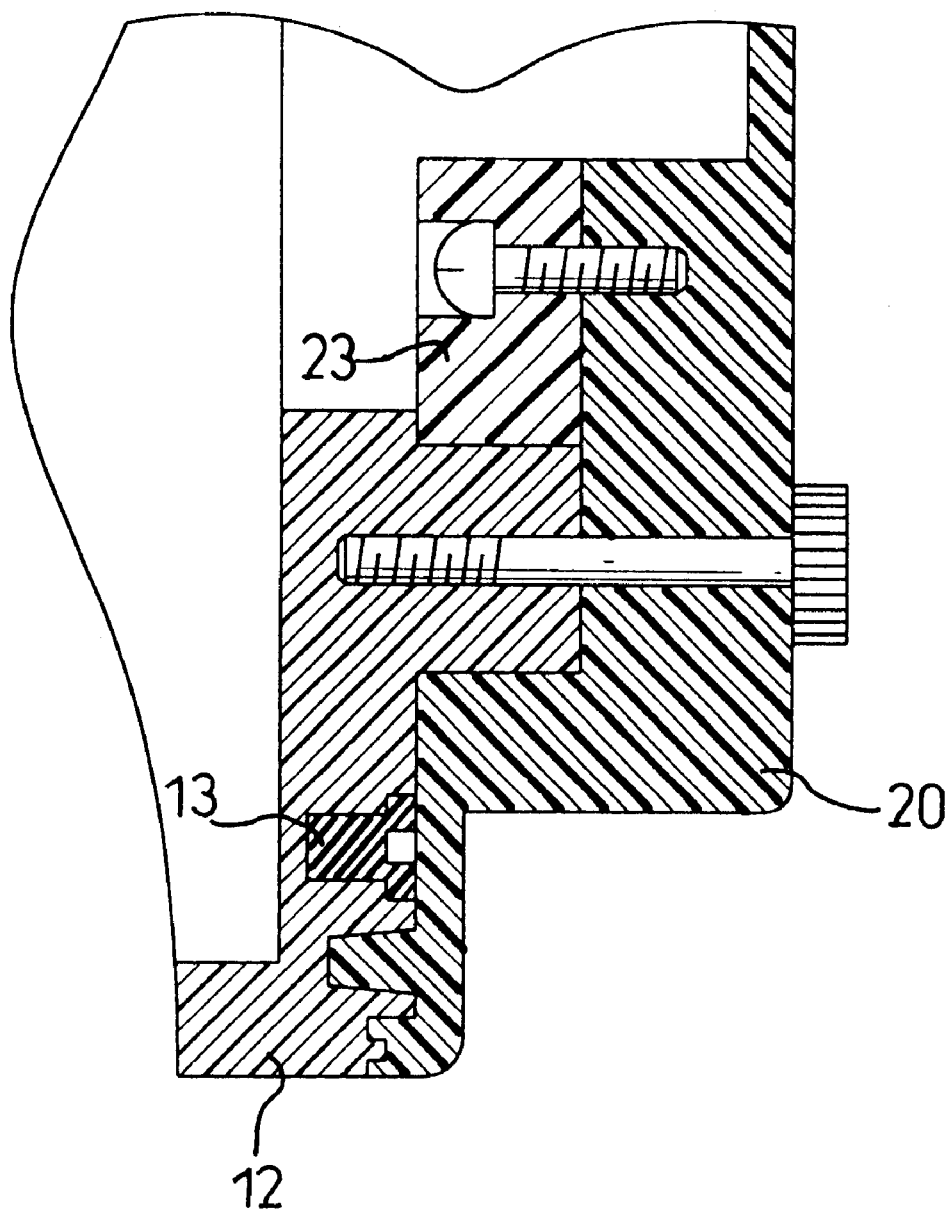
FIG. 3 is an enlarged partial sectional view of the waterproof LED display along a line "3—3" in FIG. 1.
Figure 4:
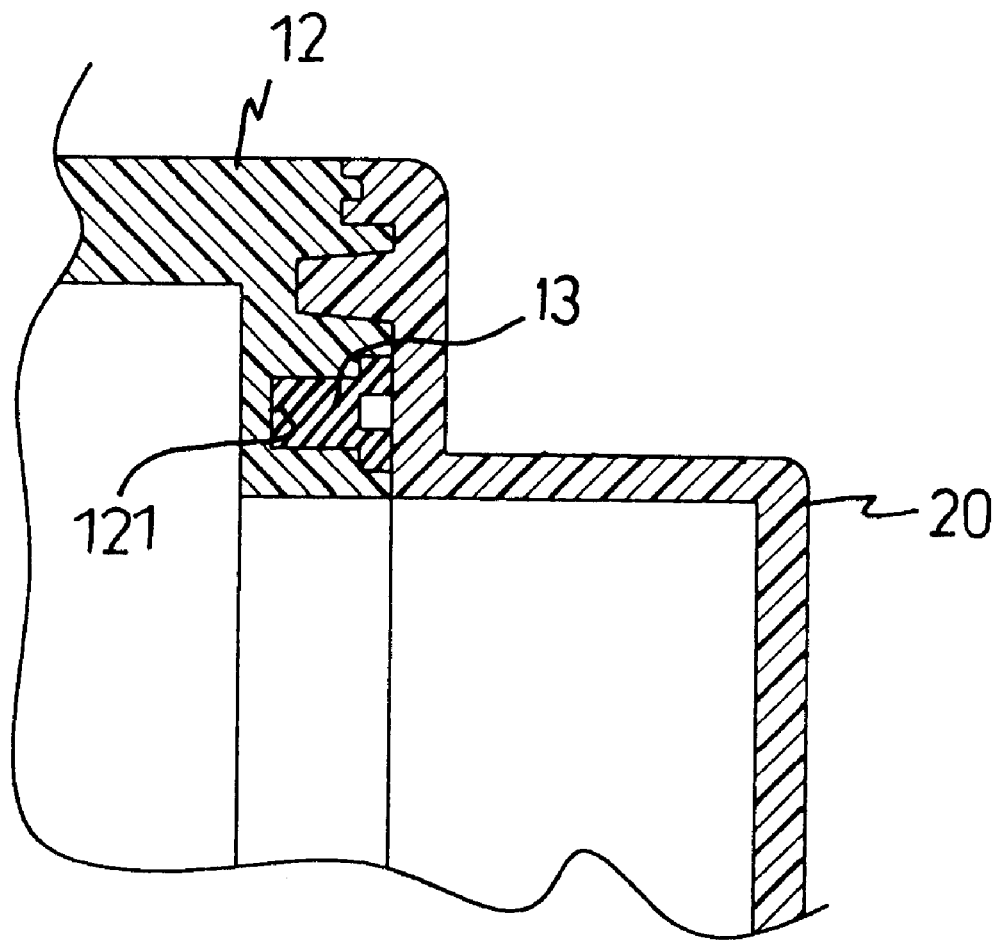
FIG. 4 is another enlarged partial sectional view of the waterproof LED display along a line "4—4" in FIG. 1.

Referring to FIGS. 3 and 4, the back seat (12) and the back cover (20) respectively form complementary teeth or steps (not numbered) engaged with each other to form a zigzag path between them, so it is more difficult for water or water vapor to penetrate the LED display.

Figure 5:
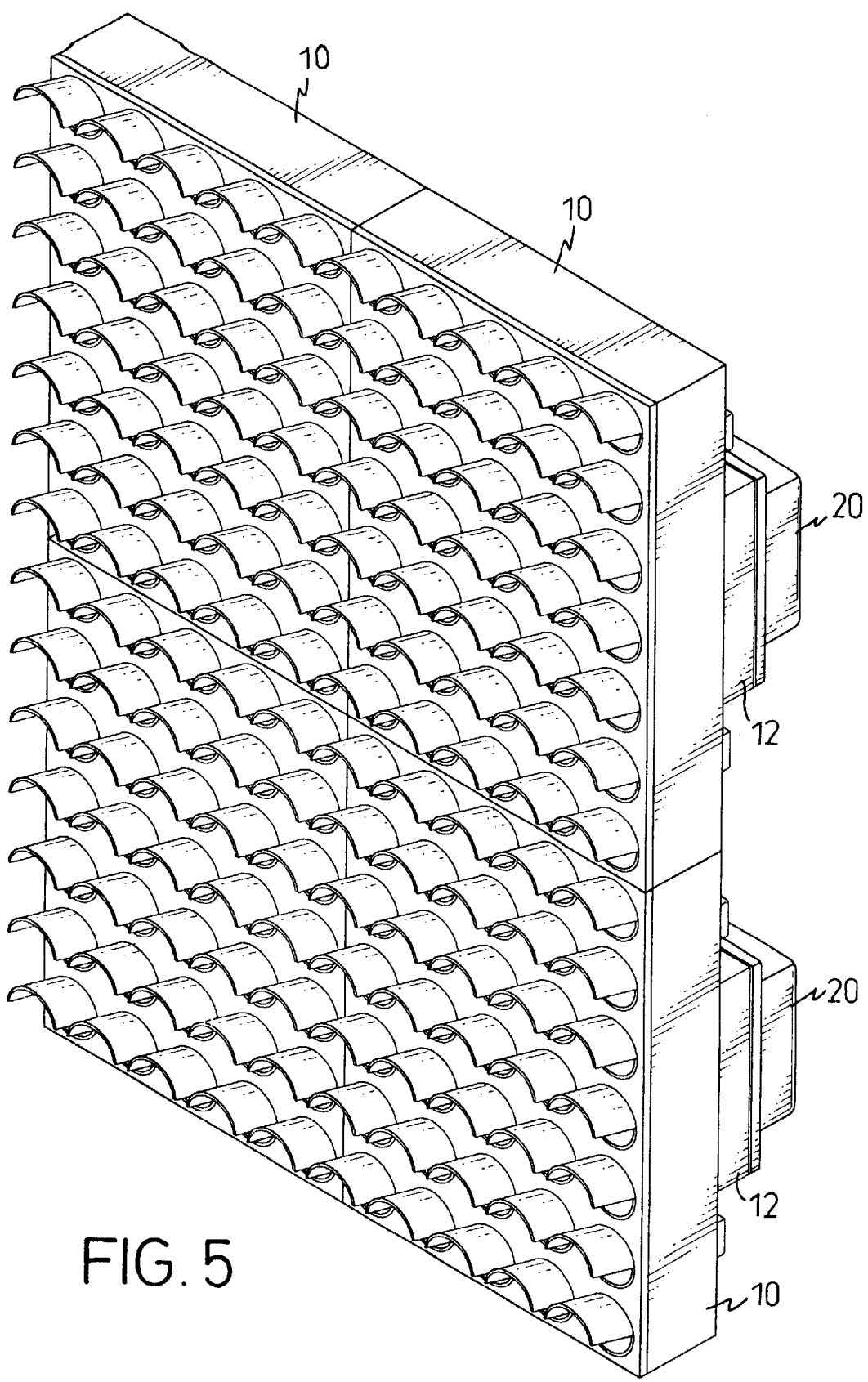
FIG. 5 is a perspective view showing a plurality of LED displays of the invention being combined together to construct a huge advertisement board.
Figure 6:
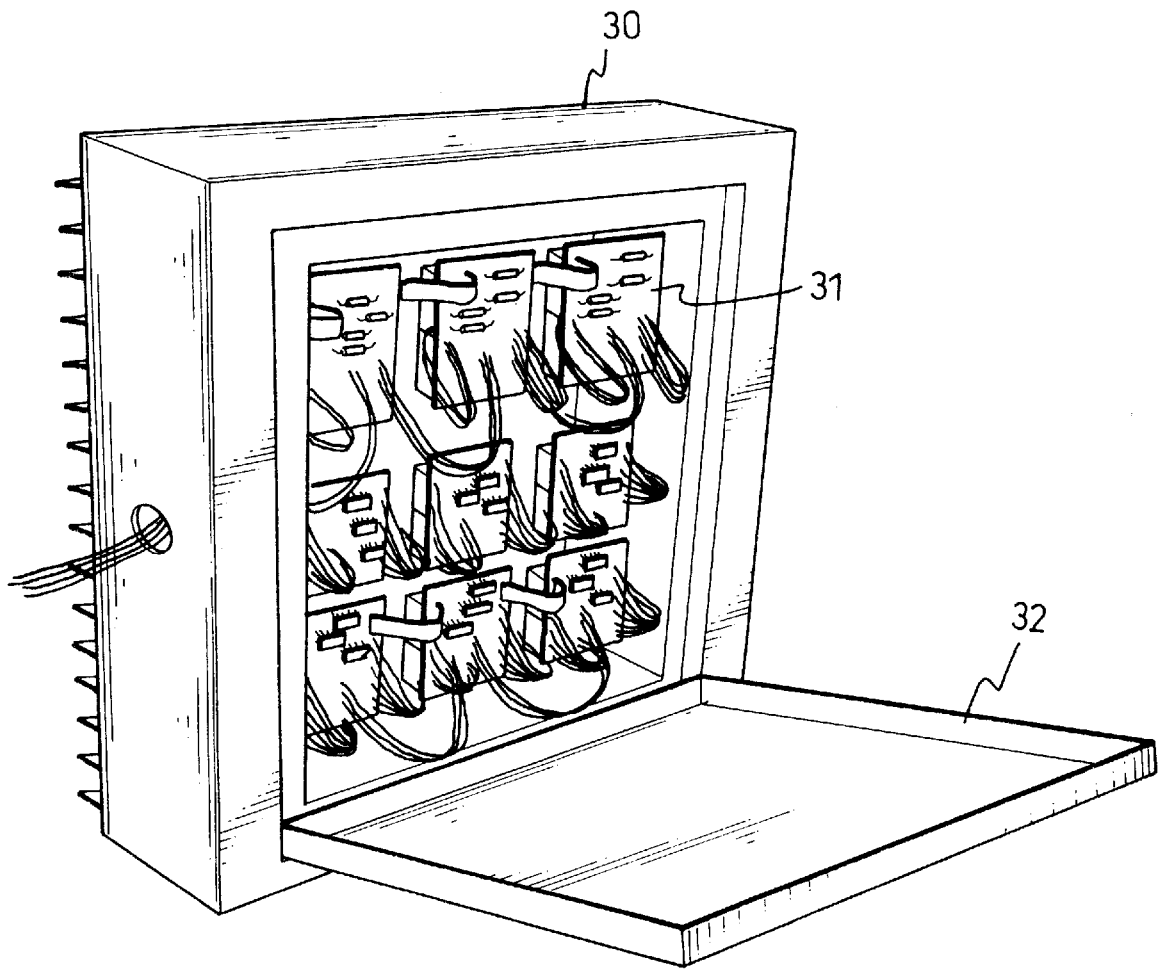
FIG. 6 is a perspective view of a conventional LED display of which a back plate is opened.

FIG. 5 shows a large screen composed of a plurality of the LED display in accordance with the present invention.

From the above description, it is noted that the invention has the following advantages:

1. Because there are steps or teeth to form a zigzag path between the back seat (12) and the back cover (20) and a gasket (13) provided in the channel (121), it is very difficult for water and water vapor to penetrate the LED display.

2. Because the wires are hidden in the flexible conduits (22) and will not be damaged by sunshine, wind and rain, the LED display has a long use life; at the same time, the flexible conduits (22) and the slots (21) are vertical so it is difficult for water and water vapor to penetrate the LED display.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A waterproof LED display comprising:

a housing (10);

a circuit board (11) provided in said housing (10) and having a plurality of LEDs (111) formed thereon;

a back seat (12) formed on a rear face of said housing (10) and having a first rim defining an opening, a channel (121) defined around said opening in said rim and a watertight device (13) received in said channel (121);

a back cover (20) mounted on said back seat (12) and having a chamber defined therein, a second rim formed around said chamber, a plurality of slots (21) vertically defined in a bottom portion of said chamber and a plurality of flexible conduits (22) respectively received in said slots (21), whereby said circuit board (11) and said LEDs (111) are sealed from external water; and a movable block (23) mounted in a notch defined in said bottom portion of said back cover (20), wherein each of said slots (21) is composed of a first half-slot defined in said movable block (23) and a second half-slot defined in an inner wall of said chamber beside said notch.

2. The waterproof LED display as claimed in claim 1, wherein said back seat (12) and said cover (20) respectively form complemented steps engaged with each other on said first and second rims.

3. The waterproof LED display as claimed in claim 1, wherein said back seat (12) and said cover (20) respectively form complemented teeth engaged with each other on said first and second rims.

4. The waterproof LED display as claimed in claim 1, wherein said back seat (12) further comprises a plurality of holes (122) defined in said first rim, and said back cover (20) further comprises a plurality of stubs (24) formed on said second rim to respectively align with and engage in said holes (122).

5. The waterproof LED display as claimed in claim 1, wherein the watertight device is a gasket.

* * * * *